United States Patent

Hawkins

[11] Patent Number: 5,767,517
[45] Date of Patent: Jun. 16, 1998

[54] HYBRID RESAMPLING METHOD FOR FAN BEAM SPECT

[75] Inventor: William G. Hawkins, Omaha, Nebr.

[73] Assignee: Board of Regents - Univ. of NE, Lincoln, Nebr.

[21] Appl. No.: 733,947

[22] Filed: Oct. 21, 1996

[51] Int. Cl.$^6$ .................................................. G01T 1/166
[52] U.S. Cl. .................................... 250/363.04; 250/369
[58] Field of Search ........................... 250/363.04, 369, 250/363.1

[56] References Cited

U.S. PATENT DOCUMENTS 5,457,321  10/1995  Ichihara et al. .............. 250/363.04

Primary Examiner—David P. Porta
Assistant Examiner—David Vernon Bruce
Attorney, Agent, or Firm—Zarley,McKee,Thomte, Voorhees & Sease; Mark D. Frederiksen

[57] ABSTRACT

A method of resampling of a sinogram from a fan beam SPECT includes the steps of angular resampling of the sinogram using frequency modulation, and thence transfers resampling of the sinogram using linear interpolation. This permits the use of parallel geometry algorithms in quantitative work without the expected degradation of resolution or the introduction of artifacts.

4 Claims, 4 Drawing Sheets

HYBRID RESAMPLING METHOD FOR FAN BEAM SPECT

TECHNICAL FIELD

The present invention relates generally to reconstruction of an object from fan beam data obtained from sinograms, and more particularly to an improved method of resampling for fan beam SPECT for quantitative work.

BACKGROUND OF THE INVENTION

Fan beam reconstruction methods for single photon computerized tomography (SPECT) of the prior art may be divided into two general categories: (1) a direct approach, and (2) a resampling approach. In the direct approach, the fan beam data are the input to a fan beam back projector, which can be derived from the integral for the parallel beam back projector by a change of variables. One disadvantage to the direct approach is that the ramp filter convolution must be replaced by a direct evaluation of the convolution. This process, which is implemented efficiently by Fourier transforms (FT) in standard parallel beam geometry, is almost always less efficient because of the need for direct evaluation of the convolution.

The resampling approach seeks to apply a resampling or rebinning technique which results in a parallel beam data set. The advantage of the resampling approach is in the fact that most tomographic algorithms have been developed for parallel geometry. The disadvantage of the resampling procedure, which is usually by linear interpolation, is that the procedure may degrade resolution and introduce artifacts.

SUMMARY OF THE INVENTION

It is therefore a general object of the present invention to provide quantitative fan beam SPECT using a hybrid resampling algorithm which permits use of parallel geometry algorithms without the expected degradation of resolution or introduction of artifacts.

These and other objects will be apparent to those skilled in the art.

The method of resampling of a sinogram from a fan beam SPECT of the present invention includes the steps of angular resampling of the sinogram using frequency modulation, and thence transfers resampling of the sinogram using linear interpolation.

DESCRIPTION OF THE PREFERRED EMBODIMENT

The assumption is usually made that the projection image of a SPECT fan beam collimator closely approximates the X-CT fan beam line integral. However, the inventor herein has found that this is not strictly true. There is an additional factor due to geometric effects that causes the sensitivity to vary across the collimator face. Thus, while the resampling by itself corrects for the distance dependent component of sensitivity, it does not correct for the transverse component. As discussed in more detail hereinbelow, this transverse component can be corrected by a post processing of the resampled projections. However, on balance, the direct methods do not correct for the transverse variation in sensitivity.

The varying fan beam collimator resolution has been characterized utilizing collimator modulation transfer function (MTF) analysis. With line source measurements, it has been found that both the perpendicular FWHM (full-width-at-half-max) and parallel FWHM were invariant over the field of view. The parallel, or axial, FWHM varied linearly with distance at approximately the same rate as a parallel hole collimator of the same description. The perpendicular (or transverse) FWHM had an additional increase that was a monotonically increasing function of the source to collimator distance, and was directly related to the diverging beam geometry. As discussed below, the depth dependent resolution of the fan beam collimator transforms via resampling to a parallel beam depth dependent model. For this reason, a frequency filter based upon the frequency distance relation (FDR) is possible.

Figure 1:
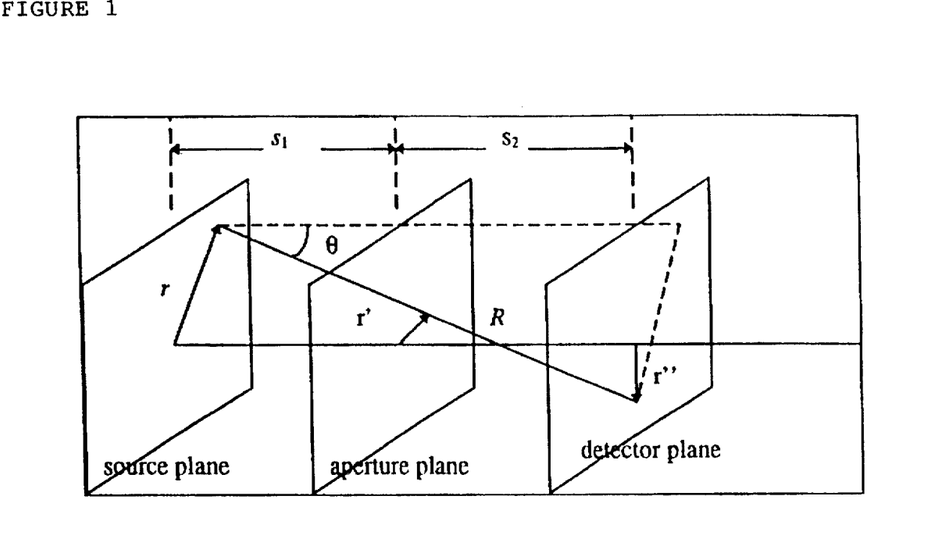
FIG. 1 is a drawing of the geometry of a general model for radiographic imaging.
Figure 2:
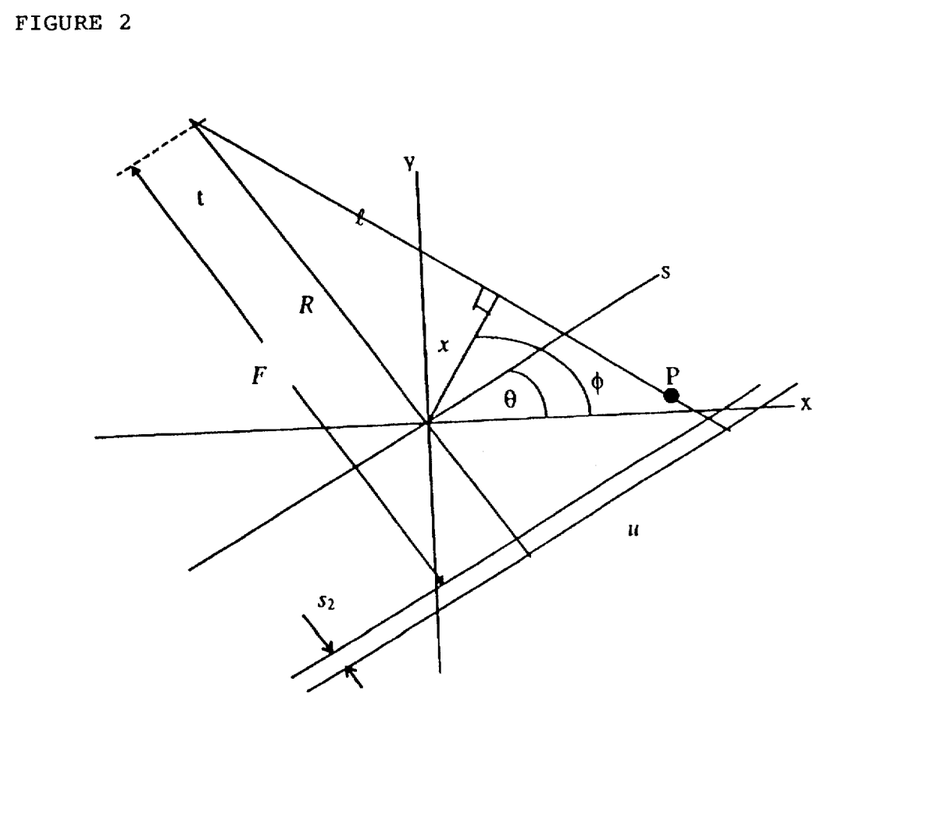
FIG. 2 is a drawing showing fan beam geometry.

For a fan beam collimator of thickness $s_2$, focal length F with aperture function $g_1$ and detector plane function $g_2$, and a point source of strength $f_0$ at a distance $s_1$ from the aperture plane, and a transverse fan beam distance $u_0$ from the optical axis of the collimator, the total counts per second tc obtained is:

$$tc(u_0, s_1) = \frac{f_0}{4\pi s_2^2} \frac{(F+s_2)}{(F-s_1)} \frac{1}{\left(\frac{u_0^2}{(F+s_2)^2}+1\right)^{3/2}} \tilde{g}_1(0)\tilde{g}_2(0). \quad \text{(Eq. 1)}$$

The tilde indicates the 2-D Fourier transform of the aperture function. The first fraction expresses the effect of collimator thickness on sensitivity. The second fraction is the term expressing the distance dependence, and the third fraction expresses the transverse dependence. The distance dependence is rectified by the resampling. The transverse component can be removed either at preprocessing or post processing. (See FIGS. 1 and 2).

Let $g_1$ and $g_2$ be circular apertures of radius $R_1$ and $R_2$ respectively. The 2-D Fourier transform of the circular aperture is the bess-sinc function and along the central ray, the result is:

$$tc(0,s_1) = \frac{f_0}{4} \frac{(F+s_2)}{s_2^2(F-s_1)} \pi R_1^2 R_2^2. \quad \text{(Eq. 2)}$$

For purposes of measuring sensitivity only, the space sampled by a fan beam bore can be replaced with a strip integral of uniform width. As a fan beam line integral is traced back to the focus, the spatial density of the strip integrals increases, so the sensitivity increases. From geometrical reasoning along, this overlap is proportional to $(F+s_2)/(F-s_1)$. At present, both resampling and direct methods are based on line integrals. No method of either type has been proposed that corrects for the transverse component in sensitivity.

Both resampling and direct methods are based on line integrals. This means that the data is independent of geometry. The sampling of the sinogram for fan beam scanning is a two-dimensional coordinate transformation. The fan beam data is obtained from a symmetric fan beam collimator in a circular orbit. The data consists of N×N planar projections, taken at M equiangular stops in 360 degrees.

The data is a fan beam data set f(u,θ) where u is the transverse coordinate, and θ is the angular coordinate. For definiteness, let us say that the acquisition is collected in a counterclockwise rotation, head view. The sinogram has been sampled at equal intervals in u and θ, and is given by:

$$f(u_j,\theta_k), u_j=(j-N/2+\tfrac{1}{2})\Delta u, j=0,\ldots,N-1, \text{ and } \theta_k=k\Delta\theta, k=0,\ldots,M-1. \quad \text{(Eq. 3)}$$

The quantity Δu is the pixel size, and $$\Delta\theta = \frac{2\pi}{M}$$

is the angle between projections.

The fan beam resampling problem for noncircular orbits is intrinsically two dimensional. In other words, $x=x(u_j,\theta_k)$ and $\phi=\phi(u_j,\theta_k)$. On the other hand, if the orbit is circular, the sampling uncouples, and the coordinate systems for the flat fan beam collimator are related by:

$$x = \frac{Ru}{\sqrt{u^2+F^2}}, \quad u = \frac{Fx}{\sqrt{R^2-x^2}}, \text{ and} \quad \text{(Eq. 4)}$$

$$\phi = \theta + \tan^{-1}\left(\frac{u}{F}\right), \theta = \phi - \sin^{-1}\left(\frac{x}{R}\right).$$

In FIG. 2, the Radon (parallel) space coordinates are (x,φ). The parameter R is the distance from the center of rotation to the focal point of the collimator. We will consider only the case for circular orbits, with R constant.

For circular orbits, the two dimensional (2-D) resampling can be separated in two one dimensional (1-D) resamplings that can be performed in either order. In the process of the present invention, an algorithm is used that first performs the angular resampling using frequency modulation, followed by transverse resampling using linear interpolation.

For angular resampling, first take the Fourier transform along the columns of the sinogram, with respect to θ, and determine the phase factors exp (imtan$^{-1}$(u$_j$/F)), where m is the angular frequency. The resampling algorithm is as follows:

1. Determine Δφ=Δθ.
2. Take the discrete Fourier transform (DFT) with respect to θ. We obtain:

$$\tilde{f}(u_j,m) = \sum_{k=0}^{M-1} f(u_j,\theta_k)\exp(-im\theta_k), \quad \text{(Eq. 5)}$$

$$m = 0,\ldots,M-1, \text{ and } j = 0,\ldots,N-1$$

3. Use frequency modulation based on Equation 2 to obtain a translation in sinogram space:

$$\tilde{f}_1(u_j,m) = \tilde{f}(u_j,m)\exp\left(imtan^{-1}\frac{u_j}{F}\right), \quad \text{(Eq. 6)}$$

$$m = 0,\ldots,M-1, \text{ and } j = 0,\ldots,N-1.$$

If the rotation is clockwise, it is easy to see that:

$$\tilde{f}_1(u_j,m) = \tilde{f}(u_j,m)\exp\left(-imtan^{-1}\frac{u_j}{F}\right),$$

$$m = 0,\ldots,M-1, \text{ and } j = 0,\ldots,N-1.$$

4. Inverse transform to obtain the resampling:

$$f_1(u_j,\phi_k = k\Delta\phi) = \sum_{k=0}^{M-1} \tilde{f}_1(u_j,m)\exp(im\phi_k), \quad \text{(Eq. 7)}$$

$$m = 0,\ldots,M-1, \text{ and } j = 0,\ldots,N-1$$

After multiplying by this phase factor and inverse transforming, the result is an intermediate sinogram that is a function of u and φ. This intermediate sinogram is defined as:

$$f_1(u_j,\phi_k)=f(u_j,\theta(\phi_k)). \quad \text{(Eq. 8)}$$

If M is an integral power of 2, use the Fast Fourier Transform (FFT) for steps 2 and 4. If M is not an integral power of 2, use the arbitrary factors algorithm that is based upon the FFT and the Z transform, or a prime factor FFT. Zero fill should not be used because the sinogram is a periodic function of θ.

Also note that the transfer function of angular resampling, (Equation 6), results in an MTF that is an ideal low pass filter. This helps explain the improved resolution of this method over other types of resampling.

The transverse resampling is accomplished using linear interpolation. The interpolation algorithm is:
1. Determine Δx from Δx=R/N. (Eq. 9)
2. For $x_j=(j-N/2+\tfrac{1}{2})\Delta x$, j=0,....,N−1, find the interval $[u_J,u_{J+1}]$ such that $u_J \le x_j < u_{J+1}$.
3. The interpolated result is given by:

$$f_2(x_j,\phi_k) = r_J f_1(u_J(x_j),\phi_k) + (1-r_J)f_1(u_{J+1}(x_j),\phi_k), \quad \text{(Eq. 10)}$$

$$\text{where } r_J = \frac{u_{J+1}-x_j}{\Delta u}.$$

The resampled sinogram is $$f_2(x_j,\phi_k)=r_J f_1(u_J,\phi_k)+(1-r_J)f_1(u_{J+1},\phi_k)=r_J f(u_J,\theta(x_j,\phi_k))+(1-r_J)f(u_{J+1},\theta(x_j,\phi_k)) \quad \text{(Eq. 11)}$$

A necessary step for the utilization of noise dependent frequency space filters such as the 2-D or 3-D Wiener filters is the accurate determination of the variance of the DFT of noisy data. The raw data is a radionuclide sinogram image, so each image element is an independent Poisson random variable. First, facts are presented that will be needed for the determination. The results are described as 1-D continuous functions, for simplicity. These results correctly generalize to 2-D and 3-D discrete functions.

1. Both the DFT and the continuous Fourier transform (CFT) are utilized. The DFT and its inverse are defined by:

$$\tilde{f}(\omega_k) = \sum_{j=0}^{N-1} f(x_j)\exp(-i2\pi kj/N), \text{ and}$$

$$f(x_j) = \frac{1}{N}\sum_{j=0}^{N-1} \tilde{f}(\omega_k)\exp(i2\pi kj/N), \text{ with}$$

$$\omega_k x_j = k\Delta\omega j\Delta x = \frac{k}{N\Delta x} j\Delta x = \frac{kj}{N}.$$

The CFT and its inverse are defined by:

$$\tilde{f}(\omega) = \int_x f(x)\exp(-i2\pi\omega x)dx, \text{ and}$$

$$f(x) = \int_{-}^{-} \tilde{f}(\omega)\exp(i2\pi\omega x)d\omega.$$

The set X is the domain of the variable x, that for our purposes is a 1-D DFT, a 1-D CFT or 2-D versions of these. An "overloaded" notation will also be used to describe a one dimensional DFT, a one dimensional CFR or two dimensional versions of these. Thus, $f(x_j,\omega_k)$ is a 1-D DFT with respect to the second variable, $f(\omega,v)$ is a 2-D CFT, etc.

The only difficulty with this notation is that the function arguments must be stated explicitly. Recall that, because of periodicity, the CFT with respect to the angular variable of the sinogram is identical with the DFT, with $\omega=\omega_k=k$, and k an integer.

2. The expectation or mean of an ensemble of random variables is defined as $\bar{f}=\langle f_i \rangle$. The operator<.> is the expectation operator based on the underlying probability density function of the stochastic process. Similarly, for the Fourier transform, we define $\bar{\tilde{f}}(\omega)=\langle \tilde{f}(\omega)\rangle$, and $\tilde{\bar{f}}, \bar{\tilde{f}}(\omega)$. (The mean of the FT is equal to the FT of the mean).

3. The quantity z* denotes the complex conjugate of z.

4. The covariance of the FT of a r.v. is defined by:

$$Cov(\tilde{g}(\omega_1)\tilde{g}(\omega_2)) = \langle\tilde{g}(\omega_1) - \bar{\tilde{g}}(\omega_1)\rangle\langle\tilde{g}(\omega_2) - \bar{\tilde{g}}(\omega_2)\rangle = \quad \text{(Eq. 12)}$$

$$\int_x dx_1 \exp(-i\omega_1 x_1) \int_x dx_2 \exp(i\omega_2 x_2) Cov(g(x_1)g(x_2))$$

The variance of the FT is then obtained from the covariance by setting $\omega_1=\omega_2$:

$$Var(\tilde{g}(\omega))\equiv_{def} Cov(\tilde{g}(\omega)\tilde{g}(\omega)).$$

5. If g(x) is an independent Poisson random variable at each position x, then:

$$Cov(g(x_1)g(x_2))=\bar{g}(x_1)\delta(x_1-x_2) \text{ with } Cov(\tilde{g}(\omega_1)\tilde{g}(\omega_2))=\bar{\tilde{g}}(\omega_1-\omega_2),$$
$$\text{and } Var(\tilde{g}(\omega))=\bar{\tilde{g}}(0). \quad \text{(Eq. 13)}$$

6. Let $$h(x) = \int_x A(x-x')g(x')dx',$$

the convolution of g with a linear operator A. Then:

$$Cov(\tilde{h}(\omega_1)\tilde{h}(\omega_2))=\tilde{A}(\omega_1)\tilde{A}(\omega_2)\bar{\tilde{g}}(\omega_1-\omega)=\tilde{A}(\omega_1)$$
$$\tilde{A}(\omega_2)\bar{\tilde{g}}(\omega_1-\omega). \quad \text{(Eq. 14)}$$

If A is the shift operator $h(x)=Ag=g(x-x_0)$, then $\tilde{A}(\omega)=\exp(-i\omega x_0)$, and $$Cov(\tilde{h}(\omega_1)\tilde{h}(\omega_2))=\exp(-i(\omega_1-\omega_2)x_0)\bar{\tilde{h}}(\omega_1-\omega_2), \text{ and}$$
$$Var(\tilde{h}(\omega))=\bar{\tilde{h}}(0). \quad \text{(Eq. 15)}$$

Comparing this with Equation 13, we see that FTI using the angular resampling algorithm of Equations 5-8 leaves the variance of FT unchanged. Thus, we expect to see no change, on average, to the variance of the FT after FTI filtering. The Monte Carlo simulations verify that conclusion. To obtain the result for the combined resampling, we note from Equation 15 that frequency modulation results in a shifted Poisson random variable. In other words:

$$Cov(\tilde{h}(\omega_1)\tilde{h}(\omega_2))=\exp(-i(\omega_1-\omega_2)x_0)\bar{\tilde{h}}(\omega_1-\omega_2) \text{ implies that}$$
$$(10b) \; Cov(h(x_1-x_0)h(x_2-x_0))=\bar{h}(x_1-x_0)\delta(x_1-x_0-x_2). \quad \text{(Eq. 16)}$$

Thus, we can consider the output of the FTI angular resampling to be a shifted ensemble of independent Poisson random variables. Hence, we can apply Equation 16 (below), with interpolation weights given in Equation 10 to determine the combined effect of angular FTI and transverse linear interpolation.

It is also clear that the Modulation Transfer Function (MTF) of frequency modulation is equal to one, so frequency modulation is an ideal low pass filter.

Another result needed is the variance of a function resulting from multiplication by a real scalar, a. From Equation 12, the result is:

$$Var(a\tilde{g}(\omega))=a^2\bar{\tilde{g}}(0). \quad \text{(Eq. 17)}$$

If the action is a vector multiply of the image g by a vector a, with $h(x_j)=a_j g(x_j)$, the variance of the FT is:

$$Var(a_j\tilde{g}(x_j)) = \sum_j a_j^2 \bar{g}(x_j). \quad \text{(Eq. 18)}$$

The Parseval summation formula for the 2-D DFT is:

$$\sum_{j=0}^{N-1}\sum_{k=0}^{M-1} |f(x_j,y_k)|^2 = \frac{1}{NM}\sum_{j=0}^{N-1}\sum_{k=0}^{M-1}|\tilde{f}(\omega_j,v_k)|^2 \quad \text{(Eq. 19)}$$

The simulated fan beam projections were generated for a "Liver-Spleen" phantom. The pixel size was chosen to be 5.85 mm, so that truncated projections could be avoided. The resampled pixel size is then 2.70 mm, which is comparable to parallel ray simulations. The processing steps were:

1. Resample the fan beam projection data to parallel beam projection data, using the two step procedure outlined above.

2. Correct for the transverse component of sensitivity using Equation 22 below.

3. Generate contours based upon an algorithm that back projects edge information to form the contour of a convex body outline.

4. Premultiply. This operation is the first step in the intrinsic attenuation correction. This algorithm accurately accounts for the "shadow" of an off-center convex attenuating body. This procedure makes it possible to accurately apply exponential back projection to complete the reconstruction.

5. Take the 2-D Fourier transform the sinogram, then remove the "far-field" component of the sinogram. This filter is described as follows:

$$\tilde{H}(n,\omega) = \begin{cases} 1, n\omega > 0 \\ 1/2, n = 0, \\ 0, n\omega < 0 \end{cases}$$

where n is the angular sinogram and $\omega$ is the radial sinogram frequency.

6. Complete the reconstruction by exponential back projection, by either a direct image space method or Fourier-Bessel reconstruction using the CHT algorithm.

The 2-D Wiener prefilter is the convolution of a gaussian, representing collimator resolution, with (modified Bessel) $K_o$ function for scatter compensation. The coordinates (x,y) are the Cartesian coordinates of the planar images. The parameters $g_x$ and $g_y$ are the full-width-at-half-max (FWHM) of the collimator resolution with respect to x and y, respectively. The parameter $\beta$ is related to the FWHM of the scatter function. The parameter SP is the scatter-to-primary ration. The symbol ** represents 2-D convolution. The filter kennel is:

$$W(\omega,\nu) = \qquad \text{(Eq. 20)}$$

$$\exp\left(-\frac{\pi^2}{4\ln 2}(g_x^2\omega^2 + g_y^2\nu^2)\right)\left(1 + \frac{\beta^2 S/P}{\omega^2+\nu^2+\beta^2}\right), \text{ and}$$

$$W(x,y) =$$

$$\frac{4\ln 2}{\pi^{3/2} g_x g_y} \exp\left(-4\ln 2\left(\frac{x^2}{g_x^2} + \frac{y^2}{g_y^2}\right)\right) **(1 + S/P\beta^2 K_0(\beta\sqrt{x^2+y^2}))$$

The evaluation of the $K_o$ function in frequency space avoids having to evaluate the removable singularity of the $K_o$ function at zero. This filter has been implemented for nonisotropic pixel sizes that is required by the resampling. The FT variance is utilized as the estimate of the noise power spectrum term in a Wiener filter previously described and applied to a 3-D resolution recovery filter based on the FDR for parallel geometry.

A critical question is determining the probability distribution function of the FT noise variance. The formulation for a nonuniform distribution of independent Poisson random variables is needed, a nontrivial number of which will have a mean at or near zero. This was approximated with a nonuniform distribution of gaussian variables. It is shown that this model accurately predicts the experimentally derived NPS of the data. The important fact for this application is that the noise power spectrum is a constant.

Figure 3:
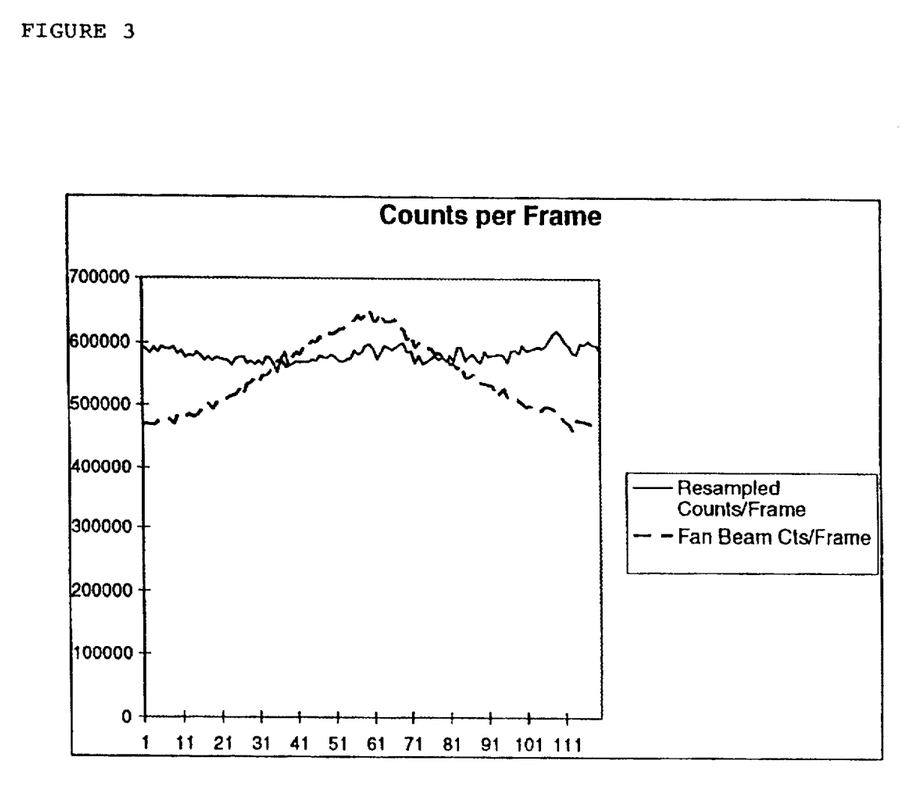
FIG. 3 is a graph showing total counts from a resampled point source scan.
Figure 4:
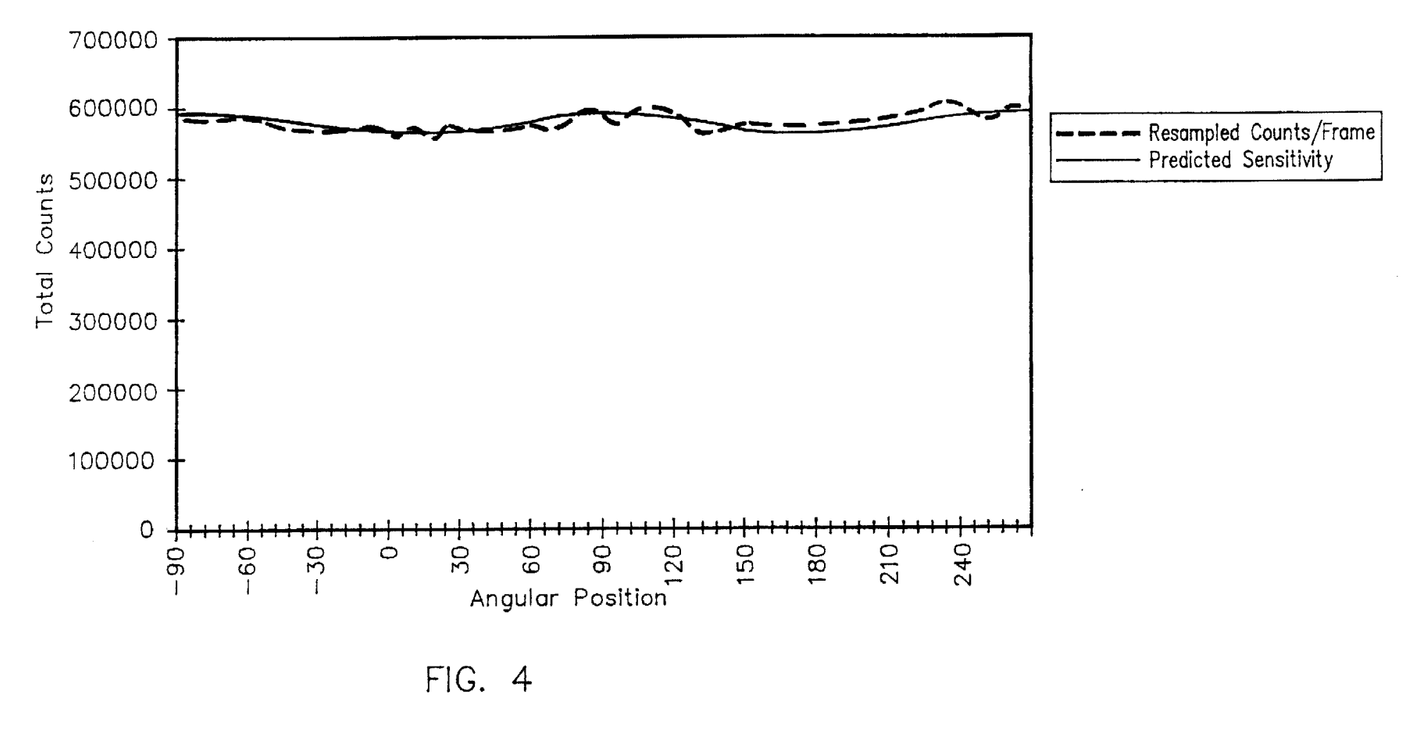
FIG. 4 is a graph showing the resampled counts of FIG. 3 plotted against the residual transverse sensitivity given in Equation 1.

In FIG. 3, the total counts are shown from a resampled point source scan. A point source 1 cm in diameter was filled with about 400 μCi of Tc-99m and placed about 5.5 cm from the center of rotation. The radius of rotation of the camera was set at 19.45 cm. The matrix size was 128, with pixel size 3.56 mm. There were 120 projections in 360 degrees, in step-and-shoot mode, with 20 sec. per stop on a Picker 3000 system with UHRFAN beam collimators. The data set was then decay corrected, and processed by the 2-step resampling method described above, except that no transverse sensitivity correction was performed. The resampled data was then analyzed by totaling the counts in each projection image. FIG. 3 shows that the number of counts in each projection is uniform, but there is still a small variation. In FIG. 4, the resampled counts from the study in FIG. 3 is plotted against the residual transverse sensitivity given in Eq. 1:

$$tc(\theta,s_1) = \frac{K}{\left(\frac{(r_0\cos\theta)^2}{(R-r_0\sin\theta)^2}+1\right)^{3/2}}, \qquad \text{(Eq. 21)}$$

where $r_0$=5.5 cm, and R=34.5 cm. The normalization constant K is chosen so that the total counts over all views is the same. There is good visual agreement between the predicted and measured total counts. Statistical tests also support the null hypothesis. A chi-square test for the first 60 projections (59 degrees of freedom) yielded a value of 4100, indicating significant differences. On the other hand, a Kolmogorov-Smirnov test indicated no significant difference at the 20% rejection level, with a t-value of 0.0048, and a t-critical of 0.098. A t-test (two-tailed, unequal variances, 119 degrees of freedom) yielded a similar result: There was no significant difference, with a t-value of $1\times10^{-12}$ and a t-critical of 1.29 at the 20% rejection level.

The post processing correction is given by:

$$f_{postcorr}(x,\phi) = f_2(x,\phi)\left(\frac{u(x)^2}{(F+s_2)^2+1}\right)^{3/2} \qquad \text{(Eq. 22)}$$

where u(x) is given by Equation 4.

Although others have determined a 3-D FDR filter for diverging collimators, their method was designed to work with a direct method of reconstruction, as a prefiltering step. In the method of this invention, I will apply the 3-D FDR to the fan beam data after resampling. Thus, the diverging beam resolution as a function of distance needs to be transformed to the resampled parallel beam geometry. The object to be reconstructed is:

$$O(x,z,\phi) = o(s,t,z;\phi).$$

The unblurred projection $f_{ll}$ in parallel geometry is given by:

$$f_1(s,z,\phi) = \int_{-\infty}^{\infty} dt\, o(s,t,z;\phi). \qquad \text{(Eq. 24)}$$

The unblurred fan beam projection $f_{fan}$ is:

$$f_{fan}(u,z,\phi) = \int_{-\infty}^{\infty} dl\, o\left(\frac{R-t(l)}{F+s_2}u, t(l), z;\phi\right) = \qquad \text{(Eq. 25)}$$

$$\frac{\sqrt{(F+s_2)^2+u^2}}{F+s_2} \int_{-\infty}^{\infty} dt\, o\left(\frac{R-t}{F+s_2}u, t, z;\phi\right),$$

where $$\frac{s}{R-t} = \frac{u}{F+s_2}. \qquad \text{(Eq. 26)}$$

The blurred 3-D projection sinogram $f_1^b(s,z,\phi)$ for parallel geometry is:

$$f_1^b(s,z,\phi) = \int_{-\infty}^{\infty} dt \int_{-\infty}^{\infty} dz' \int_{-\infty}^{\infty} ds'\, o(s',t,z';\phi)c(s-s',t,z-z'), \qquad \text{(Eq. 27)}$$

where c(s, t, z) is the blur function, and typically has a FWHM that varies linearly with the source-to-detector distance. With the substitution of Equation 17 into Equation 18, we obtain:

$$f_{fan}^b(u,z,\phi) = \qquad \text{(Eq. 28)}$$

$$\int_{-\infty}^{\infty} dl \int_{-\infty}^{\infty} dz' \int_{-\infty}^{\infty} ds'\, o(s',t,z';\phi)c\left(\frac{R-t}{F+s_2}u - s',t,z-z'\right).$$

But the factor $(R-t)/(F+s_2)=(F-s_1)/(F+s_2)$ is just the additional depth dependent factor in the fan beam transfer function. The 2-D Fourier transform of Equation 28 is:

$$\hat{f}_{fan}(\omega_1,\omega_2,\phi) = \qquad \text{(Eq. 29)}$$

$$\int_{-\infty}^{\infty} dz \int_{-\infty}^{\infty} du\, \exp(-i2\pi(\omega_1 u + \omega_2 z))f_{fan}^b(u,z,\phi) =$$

$$\int_{-\infty}^{\infty} dt \frac{F+s_2}{R-t} \tilde{o}\left(\frac{F+s_2}{R-t}\omega_1,t,\omega_2;\phi\right)\tilde{c}\left(\frac{F+s_2}{R-t}\omega_1,t,\omega_2\right)$$

The collimator resolution in parallel geometry transforms into fan beam geometry. We obtain the same Equation 29 if we use another form of Equation 28:

$$\tilde{f}_{fan}(u,z,\phi) = \int_{-\infty}^{\infty} dt \frac{R-t}{F} \int_{-\infty}^{\infty} dz' \int_{-\infty}^{\infty} du' o\left(\frac{R-t}{F}(u-u'),t,z-z';\phi\right) b\left(\frac{(R-t)u'}{F},t,z'\right),$$ (Eq. 30)

the 2-D Fourier transform is unchanged, so Equation 28 and Equation 30 are equivalent.

If b has a Fourier transform:

$$\tilde{b}(\omega_1,t,\omega_2) = \int_{-\infty}^{\infty} dz\exp(-i2\pi\omega_2 z)\int_{-\infty}^{\infty} ds\exp(-i2\pi\omega_1 s)b(s,t,z) =$$ (Eq. 31)

$$\int_{-\infty}^{\infty} dz\exp(-i2\pi\omega_2 z)\int_{-\infty}^{\infty} ds\exp(-i2\pi\omega_1 s)b\left(\frac{s_2}{s_2+R-t}s, \frac{s_2}{s_2+R-t}z\right)$$

then:

$$\tilde{b}_{fan}(\omega_1,t,\omega_2) = \int_{-\infty}^{\infty} dz\exp(-i2\pi\omega_2 z)\int_{-\infty}^{\infty} ds\exp(-i2\pi\omega_1 s)b\left(\frac{(R-t)s}{F},t,z\right) =$$ (Eq. 32)

$$\int_{-\infty}^{\infty} dz\exp(-i2\pi\omega_2 z)\int_{-\infty}^{\infty} ds\exp(-i2\pi\omega_1 s)b\left(\frac{s_2}{s_2+R-t}\frac{(R-t)s}{F},\frac{s_2}{s_2+R-t}z\right) = \tilde{b}\left(\frac{F(s_2+R-t)}{s_2(R-t)}\omega_1,\frac{s_2+R-t}{s_2}\omega_2\right).$$

This is the MTF of the fan beam collimator transfer function with the back plane distance B=O. Therefore the blur function to use with the resampled projection data is the parallel model given by Equation 27.

Equation 28 also yields a proof of the distance dependent sensitivity of a diverging beam collimator. If o is a delta function centered at $(s_0,t_0,z_0)$ so that:

$$\tilde{o}(\omega_1,t,\omega_2;\phi)=\exp(-i2\pi(\omega_1 s_0+\omega_2 z_0))\delta(t-t_0).$$ (Eq. 33)

then the sensitivity at a distance $t_o$ in the rotated frame is proportional to:

$$\tilde{f}_b(\omega_1,\omega_2,\phi) = \frac{F}{R-t_0}\tilde{o}\left(\frac{F}{R-t}\omega_1=0,t_0,\omega_2=0;\phi\right)\tilde{b}\left(\frac{F}{R-t_0}\omega_1=0,\omega_2=0\right) = \frac{\sqrt{F^2+u^2(s_0,t_0)}}{F}\frac{F}{R-t_0}$$ (Eq. 34)

The first fraction is due to the change of variables between l and t, and is almost constant for realistic collimators. The second fraction $(F+s_2)(R-t_0)$ is the distance dependent sensitivity term given in Equations 21 and 22.

To apply the F DP to the blurred projection data, first resample the data to obtain $f_2(x,z,\phi)$ and take the 3-D-FT of $f_2$:

$$\tilde{f}_2(m,\omega_1,\omega_2) = \int_0^{2\pi} d\phi \int_{-\infty}^{\infty} dx \int_{-\infty}^{\infty} dz\exp(-im\phi-i2\pi\omega_1 x-i2\pi\omega_2 z)f_2(x,z,\phi) = \tilde{f}_2(m,\omega_1,\omega_2)\tilde{c}\left(\omega_1,-\frac{m}{2\pi\omega_1},\omega_2\right)$$ (Eq. 35)

where $t=-m/2\pi v$ yields a stationary phase approximation to Equation 27. Then $$\tilde{c}\left(\omega_1,-\frac{m}{2\pi\omega_1},\omega_2\right)$$

is used in a Wiener filter to obtain an estimate of $f_1(m,\omega_1,\omega_2)$ from $f_b(m,\omega_1,\omega_2)$.

For the 3-D FDR, the blur function b is a gaussian, with:

$$c(s,t,z) = \frac{1}{2\pi\sigma_x(t)\sigma_z(t)} \exp\left(-\frac{s^2}{2\sigma_x^2(t)} - \frac{z^2}{2\sigma_z^2(t)}\right).$$

The Wiener filter is:

$$f_1(m,\omega_1,\omega_2) = \tilde{W}(m,\omega_1,\omega_2)f_b(m,\omega_1,\omega_2).$$ (Eq. 36)

with:

$$\tilde{W}(m,\omega_1,\omega_2) = \frac{\tilde{c}\left(\omega_1, -\frac{m}{2\pi\omega_1}, \omega_2\right) |\tilde{f}_e(m,\omega_1,\omega_2)|^2}{\left|\tilde{c}\left(\omega_1, -\frac{m}{2\pi\omega_1}, \omega_2\right)\right|^2 |\tilde{f}_e(m,\omega_1,\omega_2)|^2 + |\tilde{n}|^2} \quad \text{(Eq. 37)}$$

and where the estimate of the projection power spectrum | $f_e(m,\omega_1,\omega_2)|^2$ is obtained from:

$$|\tilde{f}_e(m,\omega_1,\omega_2)|^2 = metz\left[\left|\tilde{c}\left(\omega_1, -\frac{m}{2\pi\omega_1}, \omega_2\right)\right|^2, X\right] \max(|\tilde{f}_b(m,\omega_1,\omega_2)|^2 - |\tilde{n}|^2, 0). \quad \text{(Eq. 38)}$$

The function metz is a Metz filter with kernel $$\left|\tilde{c}\left(\omega_1, -\frac{m}{2\pi\omega_1}, \omega_2\right)\right|^2$$

and exponent X. The parameter X is set to 12. The quantity $|\tilde{n}|^2$ is the estimate of the FT variance of the modified projection data.

Figure 5:
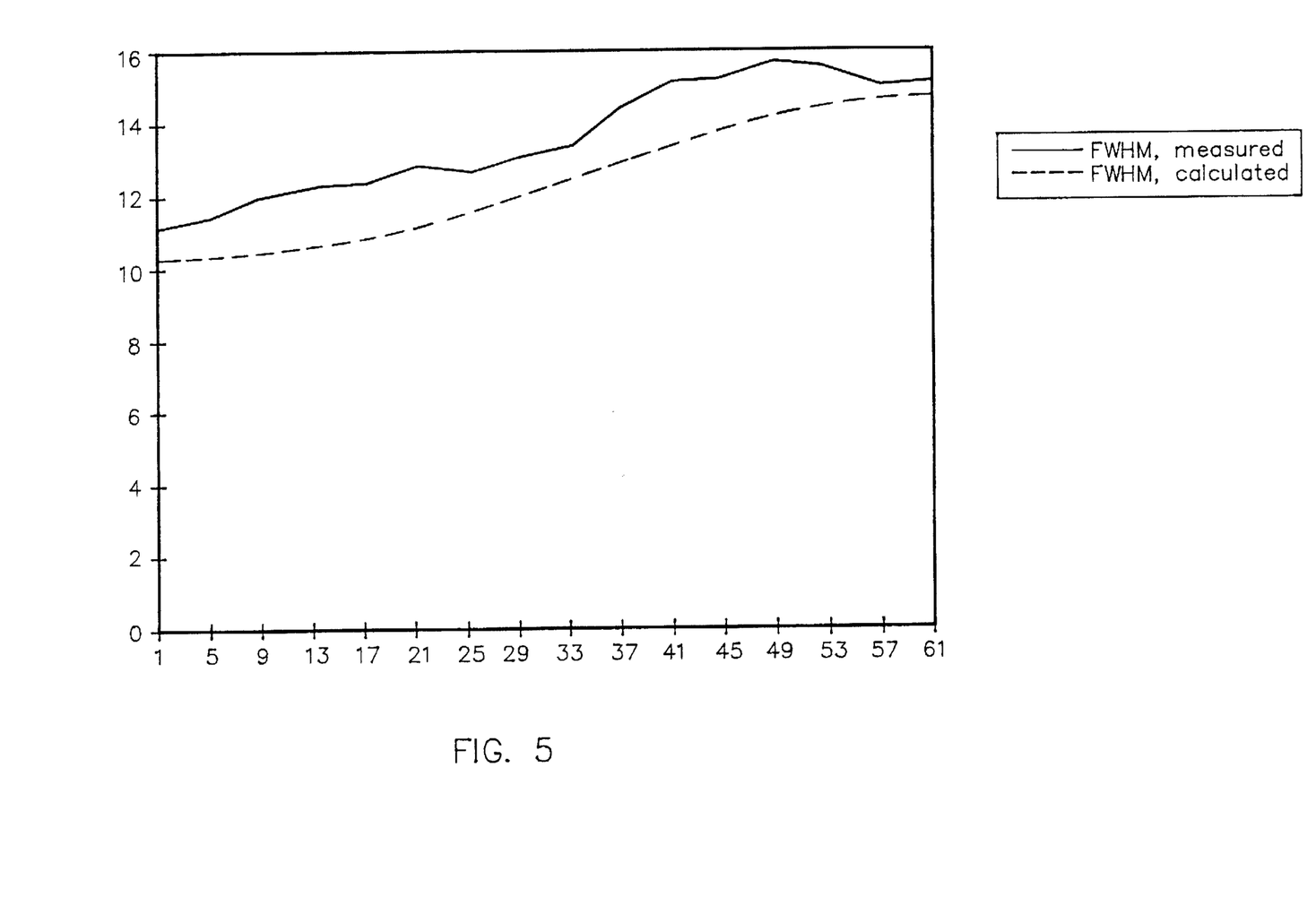
FIG. 5 is a graph showing measured versus calculated resolution of resampled data.

The same study that was used for the sensitivity study was also used for a study of resolution. The FWHM of the resampled point source images was measured as a function of distance from the detector, and compared to a parallel collimator model based on the same length (34.9 mm), width (1.4 mm) sepal thickness (0.15 mm) and shape (regular hexagonal hole). The results are shown in FIG. 5. I utilized the collimator MTF function for a regular hexagon. I used the quadrature rule to combine the various contributions to the calculated FWHM. The FWHM of the 1 cm point source projection and the intrinsic resolution (3.5 mm) were combined with the FWHM of a point source to yield an estimate of the measured FWHM. A mean interaction depth of 8.9 mm was incorporated in the calculated FWHM. The utility function used to measure FWHM demonstrated a lot of variability, but the two curves are fairly close. Also, the resolution study with the cold rod phantom and the 3-D FDR resolution filter, discussed below, demonstrate that the result of Equation 32 is valid.

For overall quantitative accuracy with uniform attenuation, the Liver-Spleen phantom for fan beam geometry, that consists of attenuating ellipses with varying amounts of activity within each ellipse, is shown. The concentrations were in the ratios 0:2:5:10. The quantitative accuracy using the resampling method has been preserved. A simulated fan beam acquisition with the following parameters was used: Focal length: 53.5 cm, focal point radium of rotation 34.82, matrix size 128, pixel size 0.585 cm, and 256 projections in 360 degrees. The large pixel size was necessary to include the liver-spleen phantom in the field-of-view. Thus, the phantom dimensions are not realistic from a physical point of view. The large size of the phantom, however, means that it is more difficult to obtain an accurate attenuation correction. The large numbers of projections were necessary because the effective transverse pixel length was about 0.3 cm, and the liver-spleen phantom was 30 cm wide from right to left. The reconstruction of the liver-spleen phantom using the resampling algorithms is illustrated in Table 2.

TABLE 2

| Region | Simulated Activity | Measured Activity |
|---|---|---|
| Air | 0 | 0.069 ± 0.005 |
| Background | 2 | 2.01 ± 0.04 |
| Spleen | 5 | 5.03 ± 0.045 |
| Liver | 10 | 9.95 ± 0.08 |
| Lesion | 0 | −0.049 ± 0.095 |

To determine how resampling algorithm affected resolution, a point source in air was scanned on the Picker 3000 equipped with UHRFAN collimators. The point source was placed 5.5 cm from the center of rotation, and the cameras were placed 19.3 cm from the center of rotation. About 300 µCi of Tc-99m was placed in a spherical point source 1 cm i.d., and the point source was placed on the headrest. The matrix size was 128, with pixel size 3.56 mm. One-hundred twenty projections were acquired in step and shoot mode. The projections were decay corrected and then reconstructed using the direct method, and again using the resampling algorithm with back projection. No low pass filtering was used.

The FWHM and FWTM of the reconstructed point source images were then measured.

Very little difference in the reconstructions was found, except that the 3-D FDR method resulted in a noticeable resolution recovery. In Table 3, the FWMH and FWTM measurements from the two methods are shown. There is also very little difference in the measurements. The 3-D FDR reconstruction has minimal artifacts, and the best resolution of the three methods was tested.

TABLE 3

| | FWHM,mm | FWTM,mm |
|---|---|---|
| Direct method | 11.03 | 20.42 |
| Resampling method | 11.28 | 20.28 |
| 3-D FDR Filter | 9.70 | 16.46 |

To test the overall practicality and effectiveness of the combined protocol, a scan was made of a standard SPECT phantom with hot spheres, cold spheres, and cold rod inserts in a uniform background of about 1 µCi/ml of Tc-99m. The sphere sizes were 31.8 mm, 25.4 mm, 19.1 mm, 15.9 mm, 12.7 mm and 9.5 mm in diameter. The rod sizes were 12.7 mm, 11.1 mm, 9.5 mm, 7.9 mm, 6.4 mm and 4.6 mm. The acquisition parameters were 120 projections in 360 degrees, continuous mode, 128 matrix with a 3.56 mm pixel size, and 15s per stop. There were about 120,000 counts in each projection.

The protocol consisted of the following steps. First, the raw data was decay corrected, scaled the output to block exponent form, and the estimate of the variance of the DFT was created. Next, the data was resampled using hybrid resampling method, and the FT variance was updated at each step. Then a 2-D stationary Wiener filter or the 3-D FDR Wiener filter was applied to the data set. A "noise multiplier" of 0.5 was used with both data sets. No attempt was made to find an optimal noise multiplier. Then the filtered projections were back projected using the CHT-Bellini method to obtain the final result.

The conventional methodology consisted of direct fan beam back projection, followed by a 3-D Wiener filter for resolution recovery and scatter correction. The default value of 0.5 was used for the noise multiplier. The last step of the conventional methodology was attenuation compensation using the post attenuation correction (one iteration).

For the hot/cold spheres study, the results of the conventional method, the 3-D FDR/resampling method, and the 2-D prefilter/resampling method were about the same, with the 3-D FDR yielding perhaps the best qualitative result. The 2-D prefilter showed somewhat more noise amplification, while the conventional 3-D post filter overfiltered the cold spheres, and was not able to resolve the smallest hot sphere, as were the other two methods.

The resampled fan beam reconstructions of the cold rod study show good resolutions, and are relatively free of artifacts. On the other hand, the conventional reconstruction was artifactual, and could not reliably detect even the large 12.7 mm rods. This protocol cannot be used to detect small cold focal lesions. The data set was very ill posed because of the low count level, a minimal number of projections and the continuous scanning. The 3-D FDR reconstruction shows the best resolution, with the 9.5 mm rods clearly resolved, and good uniformity, but with a slight ringing artifact at the center. This may be due to an inaccurate FDR filter at the low frequencies, where the stationary phase approximation is not very accurate. It is also characteristic of over correction for resolution, and is a form of aliasing. Aliasing is not well understood in resampling, because the frequency map is transformed by the resampling as well. This type of artifact is also characteristic of an inaccurate center of rotation correction, but because the 2-D prefiltered reconstruction did not show a similar result, this is not likely to be the source of error. The 3-D FDR reconstruction also showed a slight "scalloping" artifact at the periphery of the reconstruction. This was due to angular aliasing because of angular understampling. If an effective resolution of about 6 mm is assumed for the 3-D FDR and the diameter of the FoV of 25 cm, the 120 projections were below the number recommended to avoid angular aliasing [22, 23]. The 3-D FDR filter, because it results in additional resolution, will need to have M larger than with more conventional reconstruction methods.

In summary, there has been shown that there is a depth dependent factor and transverse factor in the determination of fan beam sensitivity. Straightforward geometric arguments determine the nature of the depth-dependent fan beam sensitivity, and how it can be rectified with resampling to parallel geometry. The transverse component closely follows the predicted values, and is removed by a post processing procedure. The sensitivity point source study validated this result. The variation, however, is not great; it is less than 5% for a FoV 11 cm in diameter.

The depth dependent resolution also depends on a similar geometric factor, and there is no transverse variation in resolution. It has been shown that the depth dependent fan beam resolution can be transformed to an equivalent parallel beam model with reasonable accuracy.

Also, resampling allowed the use of existing and effective methodology for compensation of uniform attenuation: The contouring algorithm, the premultiply algorithm, and the CHT back projection algorithm for parallel geometry and uniform attenuation were utilized without modification. The 3-D FDR algorithm and the 2-D prefilter had to be modified for anisotropic pixel sizes.

An interesting observation is that frequency modulation is an ideal low pass filter with maximum bandwidth, whereas linear interpolation necessarily cannot be.

The reconstructed point source study demonstrated that resolution is not much affected by the resampling algorithm. This is unexpected, because linear interpolation is still needed for this method. Perhaps the greatest errors in resampling methods based on 2-D interpolation came from the angular interpolation. The 3-D FDR filter gave the best improvement in resolution.

The 3-D FDR method developed here is effective and is fairly efficient, the greatest numerical cost being the computation of 3-0D FFTs for large clinical data sets. In its present configuration, the small amount of processing time required will not preclude it from clinical application.

I claim:

1. A method of hybrid resampling of a sinogram from a fan beam SPECT, comprising the steps of:

angular resampling of the sinogram using frequency modulation; and transverse resampling of the sinogram using linear interpolation.

2. The method of claim 1, wherein fan beam data is obtained from a symmetrical fan beam collimator in a circular orbit, wherein the data consists of a plurality of planar projections taken at M equiangular stops in 360°, wherein M is an integral power of 2, and wherein the step of angular resampling includes the steps of:

A. taking the discrete fast fourier transform along columns of the sinogram with respect to the angular coordinate;

B. using frequency modulation based on the transform of step A to obtain a translation in sinogram space; and C. inverse transforming the translation using the fast fourier transform.

3. The method of claim 1, wherein fan beam data is obtained from a symmetrical fan beam collimator in a circular orbit, wherein the data consists of a plurality of planar projections taken at M equiangular stops in 360°, wherein M is not an integral power of 2, and wherein the step of angular resampling includes the steps of:

A. taking the discrete prime factor Z-transform based on the fast fourier transform along columns of the sinogram with respect to the angular coordinate;

B. using frequency modulation based on the transform of step A to obtain a translation in sinogram space; and C. inverse transforming the translation using a prime factor fast fourier transform.

4. A method of reconstructing an object from sinograms from a fan beam SPECT, comprising the steps of:

A. obtaining fan beam projection data from a symmetric fan beam collimator in a circular orbit;

B. resampling the fan beam projection data to parallel beam projection data, comprising the steps of:

1. angular resampling the sinogram using frequency modulation; and 2. transverse resampling the sinogram using linear interpolation;

C. correcting the parallel beam projection data for the transverse component of sensitivity;

D. generating contours based upon an algorithm that back projects edge information to form the contour of a convex body outline;

E. pre-multiplying, using an algorithm which accounts for the shadow of an off-center convex attenuating body;

F. taking the two-dimensional fourier transform of the sinogram;

G. removing the far field component of the sinogram; and

H. exponentially back projecting the projection data.

* * * * *

UNITED STATES PATENT AND TRADEMARK OFFICE
CERTIFICATE OF CORRECTION

| | | |
|---|---|---|
| PATENT NO. | : 5,767,517 | Page 1 of 1 |
| APPLICATION NO. | : 08/733947 | |
| DATED | : June 16, 1998 | |
| INVENTOR(S) | : William G. Hawkins | |

It is certified that error appears in the above-identified patent and that said Letters Patent is hereby corrected as shown below:

Column 1,
Line 3, please insert the following paragraph:
-- Pursuant to 35 U.S.C. §202 (c) it is acknowledged that the U.S. Government has certain rights in the invention described herein, which was made in part with funds from the National Institutes of Health, grant number NIH ER61195.--

Signed and Sealed this

Seventeenth Day of July, 2007

JON W. DUDAS
*Director of the United States Patent and Trademark Office*